United States Patent
Ye et al.

(10) Patent No.: US 10,313,230 B1
(45) Date of Patent: *Jun. 4, 2019

(54) SYSTEM AND METHOD FOR UNMARSHALLED ROUTING

(71) Applicant: OPEN INVENTION NETWORK LLC, Durham, NC (US)

(72) Inventors: Qin Ye, Plano, TX (US); Robert W. Peterson, Plano, TX (US); Thomas T. Wheeler, Frisco, TX (US)

(73) Assignee: OPEN INVENTION NETWORKS LLC, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/653,252

(22) Filed: Jul. 18, 2017

Related U.S. Application Data

(63) Continuation of application No. 14/859,272, filed on Sep. 19, 2015, now Pat. No. 9,712,429, which is a continuation of application No. 13/078,939, filed on Apr. 2, 2011, now Pat. No. 9,143,440.

(51) Int. Cl.
  *H04L 12/721* (2013.01)
  *H04L 12/741* (2013.01)
  *H04L 29/06* (2006.01)

(52) U.S. Cl.
  CPC ............ *H04L 45/34* (2013.01); *H04L 45/566* (2013.01); *H04L 45/74* (2013.01); *H04L 63/0428* (2013.01); *H04L 69/22* (2013.01)

(58) Field of Classification Search
  CPC ....... H04L 12/02–12/66; H04L 45/02–45/748; H04L 61/10–61/6095; H04L 63/02–63/308; H04L 67/02–67/42; H04L 69/02–69/40
  See application file for complete search history.

(56) References Cited

U.S. PATENT DOCUMENTS

| | | | | |
|---|---|---|---|---|
| 5,524,253 A * | 6/1996 | Pham | ................. | G06F 9/46 703/27 |
| 7,331,049 B1 * | 2/2008 | Jin | ................. | G06Q 10/107 709/201 |
| 7,649,884 B1 * | 1/2010 | Ahmed | ............. | H04L 12/1877 370/254 |
| 9,143,440 B2 * | 9/2015 | Ye | .................. | H04L 63/0428 370/392 |
| 9,712,429 B1 * | 7/2017 | Ye | .................. | H04L 45/34 370/393 |
| 2004/0006652 A1 * | 1/2004 | Prall | ................. | G06F 9/542 719/318 |

\* cited by examiner

*Primary Examiner* — Timothy J Weidner

(57) ABSTRACT

In distributed object computing, messages from a source node to a destination node are often required to be routed via one or more intermediate nodes. In order to enhance efficiency of the relay process, a message envelope of a message may include a node list field that specifies the routing path of the message. The communication protocol for communicating the message may specify that when a message is received into a particular node, the node analyzes the node list field. If the identity of the node is last in the node list field, then the node is the destination node and thus the node unmarshals the message. Otherwise, the node forwards the message to the next node in the field list without unmarshalling the message.

14 Claims, 4 Drawing Sheets

SYSTEM AND METHOD FOR UNMARSHALLED ROUTING

CROSS REFERENCE TO RELATED APPLICATIONS

This application claims priority of and is a continuation of U.S. Ser. No. 14/859,272, entitled SYSTEM AND METHOD FOR UNMARSHALLED ROUTING, filed on Sep. 19, 2015, now issued U.S. Pat. No. 9,712,429, issued on Jul. 18, 20176, which is a continuation of U.S. Ser. No. 13/078,939, entitled SYSTEM AND METHOD FOR UNMARSHALLED ROUTING, filed on Apr. 2, 2011, now issued U.S. Pat. No. 9,143,440, issued on Sep. 22, 2015, incorporated herein by reference in its entirety.

FIELD OF THE INVENTION

This disclosure relates to systems and methods for network communications and in particular to communications between applications executing at various nodes of a network.

BACKGROUND OF THE INVENTION

In many instances, there is a requirement for an application executing on a node, say Node A, to communicate with another Node, say Node C, but there may be no direct communication possible and thus Node A sends the communication via one or more intermediate nodes, say Node B, which relays the communication to Node C. Typically, Node B would unmarshal the message and find out the message is intended for Node C. Node B would then re-marshal the message and then send the message to node C on behalf of node A.

One of the problems with this system is that it is inefficient and can have a performance penalty. An intermediate node wastes time and resources on unmarshalling and marshalling a message that is not intended for it. More importantly if node B needs to unmarshal the message for node A, it needs to have the knowledge of a Data Transfer Object (DTO) of the class to be unmarshalled, which sometimes is unavailable to node B. If the message were encrypted, node B would also need to have the knowledge of the private key to decrypt the message, which again, is not always available.

What is required is an improved system and method for non-direct communication between nodes.

SUMMARY OF THE INVENTION

Messages from a source node to a destination node are often required to be routed via one or more intermediate nodes. In order to enhance efficiency of the relay process, an envelope of a message may include a node list field that specifies the routing path of the message. The communication protocol for communicating the message may specify that when a message is received at a particular node, the node analyzes the node list field. If the identity of the node is positioned last in the node list field, then the node is the destination node and thus the node unmarshals the message. Otherwise, the node forwards the message to the next node in the field list without unmarshalling the message.

In one aspect of the disclosure, there is provided a method for communicating a message from a source node to a destination node via one or more intermediate nodes. In the method, a node list is determined that specifies a routing sequence of nodes between the source node and the destination node. A message envelope comprising a node list field that specifies the node list is then generated for a message, which is then transmitted from the source node.

In one aspect of the disclosure, there is provided a method for receiving a message sent from a source node toward a destination node into a node on a routing path between the source node and the destination node. In the method, once the message is received at a node on the routing path, the node processes a node list field of a message envelope of the message to determine whether a node identity of the node is last in the node list. If the node identity is last in the node list, the message is unmarshalled by the node. If the node identity is not the last in the node list, the message is forwarded to the next node in the node list.

In one aspect of the disclosure, there is provided a computer network comprising a plurality of nodes, each of which is configured to execute a communication protocol. Each node is configured to generate, transmit and receive messages according to the communication protocol. The communication protocol may specify that a received message is unmarshalled at a node only if the node is a destination node for the message.

BRIEF DESCRIPTION OF THE DRAWINGS

Reference will now be made, by way of example only, to specific embodiments and to the accompanying drawings in which.

DETAILED DESCRIPTION OF THE INVENTION

Figure 1:
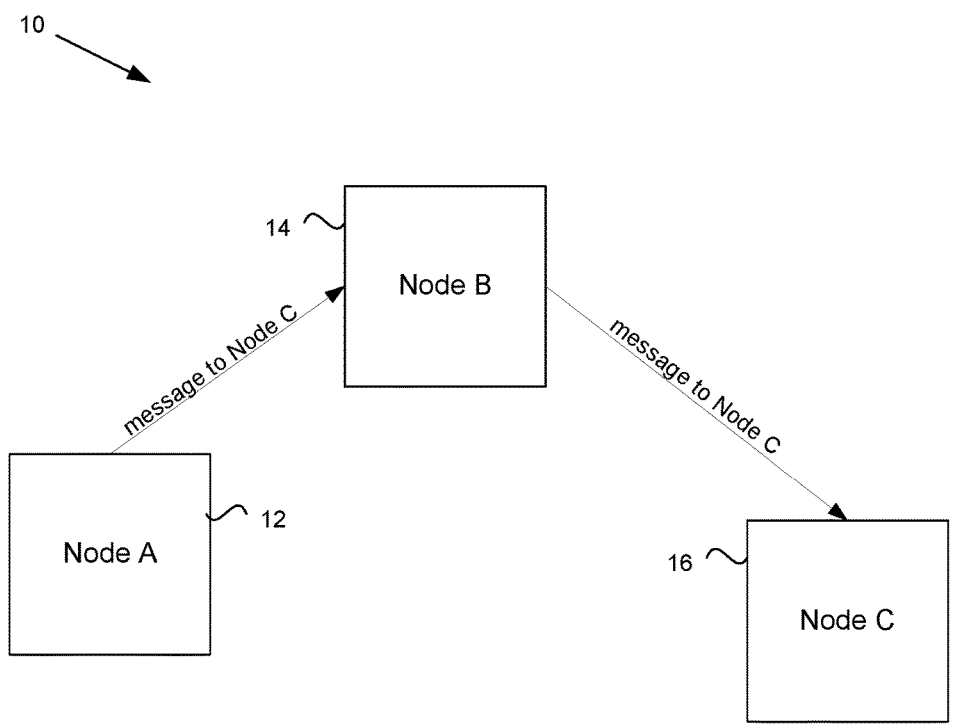
FIG. 1 shows a network of nodes.

In FIG. 1, there is shown a network of nodes 10. The network 10 includes Node A 12, Node B 14 and Node C 16. Both of Node A 12 and Node C 16 may be able to communicate with Node B 14, but Node A 12 and Node C 16 are unable to communicate directly. While FIG. 1 depicts only a single intermediate node between Node A 12 and Node C 16, i.e. Node B 14, in practice there may be any number of intermediate nodes between a source node and a destination node.

Figure 2:
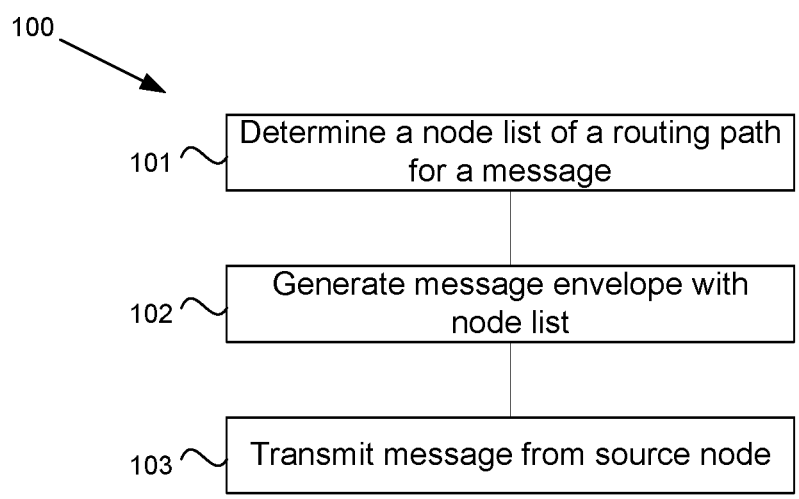
FIG. 2 shows a method for generating and sending a message from a source node.

At some instance, a source node, say Node A, may need to communicate with a destination node, say Node C. A method for generating and sending a message from Node A toward Node C is depicted in the flowchart 100 of FIG. 2. At step 101 Node A determines a node list of a routing path to Node C for the message. The node list is included in a message envelope of the message (step 102) and then Node A sends the message (step 103).

The creation of the node list in the message envelope allows for routing of the message by any intermediate nodes without the need to unmarshal the message before relaying the message. Unmarshalled routing declares that a message targeted at a remote node C will pass through the node B without interpreting (unmarshalling) the actual message using its protocol. When the message hits the node B, the message is forced onward on the routing path after it has recognized the wrapping envelope. This envelope, generated by the source node A, encapsulates the whole message intended for the destination node C. As bytes arrive at the node B, they are routed and "pumped" to the node C.

The wrapping envelope introduces a field in the envelope that lists all potential nodes that a message can travel through. When a node gets the message, it checks out if it is the intended destination (node listed in the end). If its node name is not the destination node, it does not unmarshal the payload and remarshal the payload. It just directly sends the message to the next node on the list.

Figure 3:
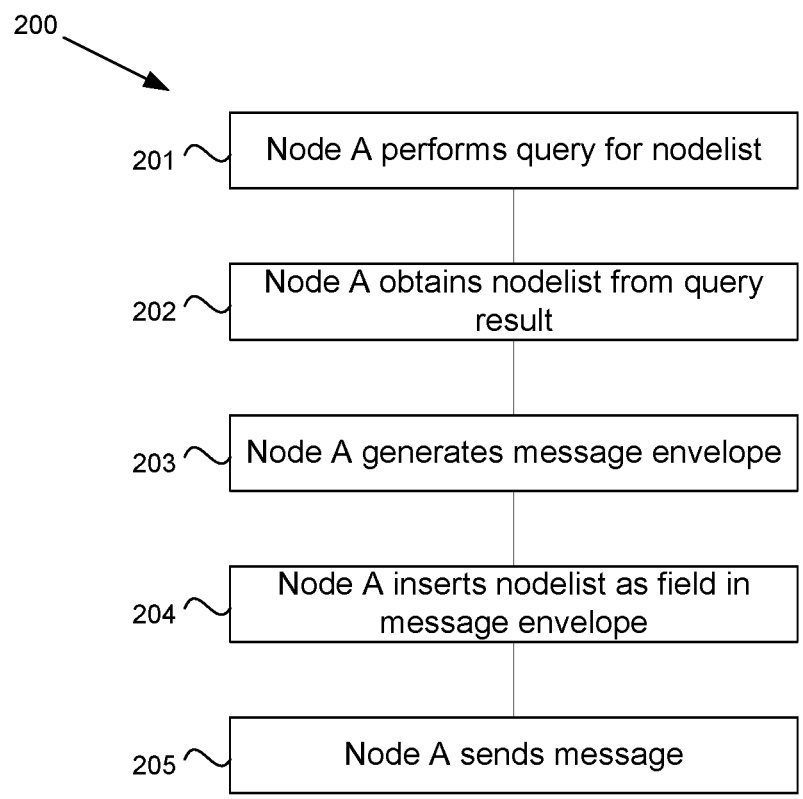
FIG. 3 shows a method for generating a message envelope with a node list field.

A process undertaken by the source node is depicted in the flowchart 200 of FIG. 3. At step 201, the source node, having determined a communication requirement, performs a query to determine a node list for the communication. In one embodiment, the query may be done using database or by making use of other network configuration tools that will be apparent to a person skilled in the art. The specific implementation for retrieving the node list is not considered to be pertinent to the present disclosure. Of relevance is that the node list may be obtained using various "query" resources. The input of the query is the source node and destination node. The output or result of the query is the routing path of the node list starting from source node, travelling via one or many intermediate nodes and ending with the destination node. At step 202, the source node receives the node list back and generates a message envelope (step 203), which includes a node list field. The source node then inserts the node list returned by the node list query into the node list field. The node list field thus lists all the nodes that the message needs to travel through, starting from source node and finishing with the destination node. In the example of FIG. 1, the node list would specify nodes A, B, C where A is the source node, B is the intermediate node which can be reached by both A and C. And C is the destination node. The field can potentially contain several intermediate nodes in front of the final destination node. A message including the message envelope and a message payload may then be sent at step 205.

Figure 4:
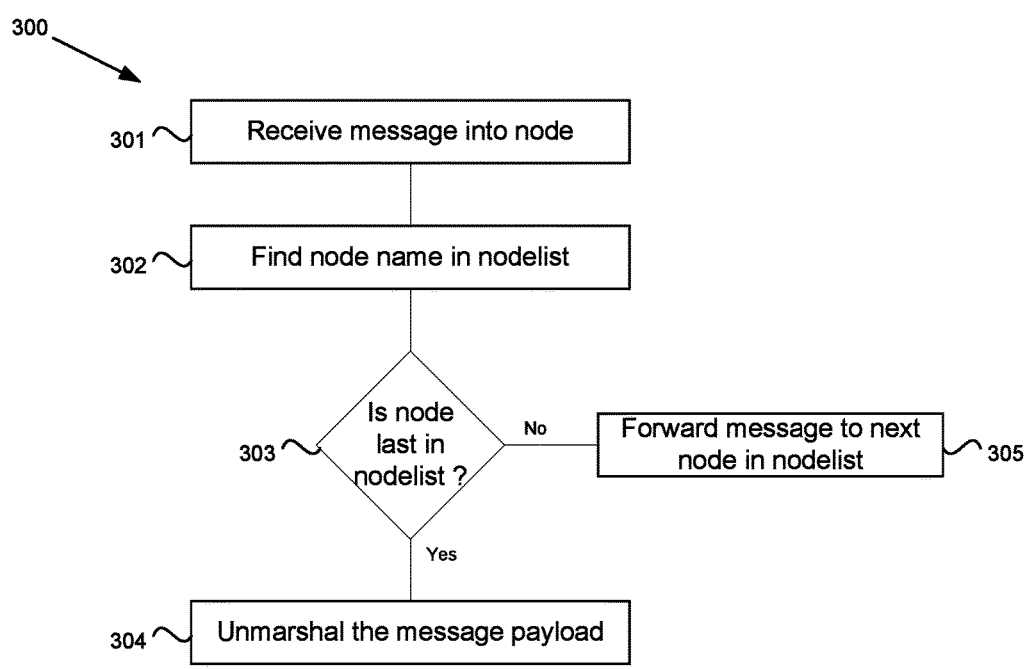
FIG. 4 shows a method for receiving a message at a node.

A process for communicating the message is depicted in the flowchart 300 of FIG. 4. At step 301, a node receives the message. This process may include the source node receiving the message in a sending module from a message generating module. The message protocol specifies that the receiving node checks the node list field of the message envelope 302 to locate the node's own identity in the node list. At step 303, the node determines if the node's identity is at the end of the node list. If so, the node unmarshals the payload and processes the message accordingly (step 304). Otherwise, the node selects the next node of the node list and forwards the message.

The methods described above are particularly applicable in distributed computing. In distributed computing, an Object Request Broker (ORB) is a piece of middleware software that allows programmers to make function calls from one computer to another via a network. The ORB handles the transformation of data structures to and from the network through a series of byte sequences. In order to preserve the state of the object transferred over the network, the object needs to be marshalled or serialized first then sent to the wire. At the other end the object is reconstructed by unmarshalling or deserializing the byte stream. Using the presently described methods, the requirement to unmarshal or deserialize the byte stream is removed if the node is not the destination node.

The methods described also increase efficiency because it is more efficient for the intermediate nodes to directly relay the message to its intended destination node C. Since the message is not designated to the intermediate nodes, these nodes do not need to process the message payload (for example, the invocation arguments or invocation result is never unmarshalled by the intermediate node). If the message is encrypted, the intermediate nodes no longer need to have the knowledge of the private key to decrypt the message. Furthermore, the intermediate nodes do not need to have the knowledge of the Date Transfer Object (DTO) of the class that it tries to unmarshal.

The components of the network 10 may be embodied in hardware, software, firmware or a combination of hardware, software and/or firmware. In a hardware embodiment, each node may comprise a processor and an operatively associated memory that stores instructions, executable on the processor for performing the above described communication protocols and methods.

To be able to send messages over the network, the sending side must serialize, i.e. marshal, the message while the destination side needs to deserialize, i.e. unmarshal, the message so that the integrity of the message can be preserved. In that sense, the embodiments described above are applicable to any types of messages that can be sent over the network, with the emphasis being on efficiency and the ability to forward a message without unmarshalling the message if the message is not intended for that node.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for communicating a message from a source node to a destination node via one or more intermediate nodes, the method comprising:
   marshalling a payload of the message such that the one or more intermediate nodes are unable to unmarshal the message;
   inserting a node list that specifies a routing sequence of nodes for the message in a message envelope of the message; and
   transmitting the message, comprising the marshaled payload and the message envelope, from the source node to a first node of the routing sequence of nodes.

2. The method of claim 1 comprising determining the node list, wherein determining the node list comprises generating a query that specifies the source node and the destination node.

3. The method of claim 1 comprising:
   receiving the message in an intermediate node of the one or more intermediate nodes;

determining the next node in the node list from the node list of the message envelope; and forwarding the message to the next node.

4. The method of claim 3 comprising forwarding the message without unmarshalling the message.

5. The method of claim 3 wherein the payload of the message is encrypted at the source node, the method comprising forwarding the message without decrypting the payload.

6. The method of claim 1 comprising:

determining from the node list that the first node is the destination node of the message; and unmarshalling the message.

7. A method for receiving a message sent from a source node toward a destination node at a node between the source node and the destination node, the method comprising:

receiving the message at the node, the message comprising a message envelope and a payload, the message envelope comprising a node list comprising a routing sequence of nodes between the source node and the destination node;

if a node identity of the node is last in the node list, unmarshalling the payload;

if the node identity is not the last in the node list, forwarding the message to the next node in the node list; and wherein the payload of the message comprises a class such that if the node identity is not the last in the node list, the node is unable to unmarshal the message.

8. The method of claim 7 wherein forwarding the message comprises forwarding the message without unmarshalling the payload.

9. The method of claim 7 wherein the payload of the message is encrypted at the source node, and wherein forwarding the message comprises forwarding the message without decrypting the payload.

10. A non-transitory computer readable medium comprising instructions that, when read by a processor, cause the processor to:

marshal a payload of a message such that one or more intermediate nodes are unable to unmarshal the message;

insert a node list that specifies a routing sequence of nodes, from a source node to a first node of a routing sequence of nodes, for the message in a message envelope of the message; and transmit a message, comprising the marshaled payload and the message envelope.

11. The non-transitory computer readable medium of claim 10 comprising instructions, that when read by the processor, cause the processor to determine the node list by generating a query that specifies the source node and a destination node.

12. The non-transitory computer readable medium of claim 10 comprising instructions, that when read by the processor, cause the processor to:

receive the message in an intermediate node of the one or more intermediate nodes;

determine the next node in the node list from the node list of the message envelope; and forward the message to the next node.

13. The non-transitory computer readable medium of claim 12 comprising instructions, that when read by the processor, cause the processor to forward the message without unmarshalling the message.

14. The non-transitory computer readable medium of claim 12 wherein the payload of the message is encrypted at the source node, and the message is forwarded without decrypting.

* * * * *